J. W. ESTES.
LOCOMOTIVE CAB WINDOW.
APPLICATION FILED JULY 3, 1909.

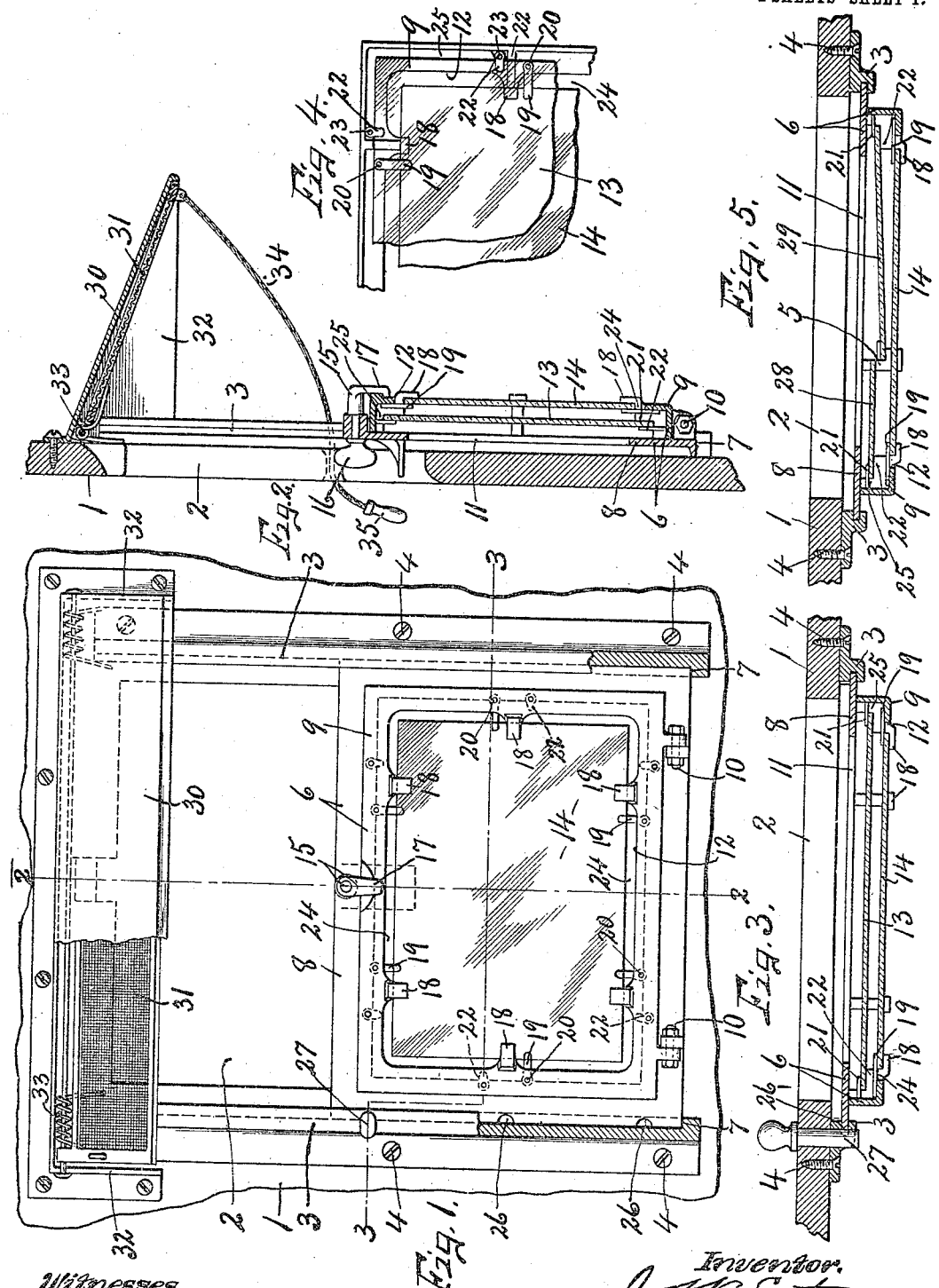

960,861.

Patented June 7, 1910.
2 SHEETS—SHEET 2.

Witnesses.

Inventor.
J. W. Estes
By Howard P. Denison
Attorney.

UNITED STATES PATENT OFFICE.

JAMES W. ESTES, OF SYRACUSE, NEW YORK.

LOCOMOTIVE-CAB WINDOW.

960,861.          Specification of Letters Patent.      Patented June 7, 1910.

Application filed July 3, 1909. Serial No. 505,835.

*To all whom it may concern:*

Be it known that I, JAMES W. ESTES, of Syracuse, in the county of Onondaga, in the State of New York, have invented new and useful Improvements in Locomotive-Cab Windows, of which the following, taken in connection with the accompanying drawings, is a full, clear, and exact description.

This invention relates to certain improvements in locomotive cab windows, and refers more particularly to what is commonly known as "lookout" windows adapted to be placed in the front of the cab at one or both sides of the boiler to enable the engineer or fireman to have a clear vision ahead.

The main object is to prevent the accumulation of steam, moisture, snow and other elements upon the glass which might obscure clear vision ahead of the train. In other words, I have sought to produce a free circulation of air across and around the sight glass or glasses of the window, whereby such snow or other accumulations of moisture would be instantly removed and the glass kept reasonably dry and clear.

Another object is to enable the sight glass or glasses to be readily removed at will for cleaning or replacement by new glass should either of them become broken.

A further object is to provide for the adjustment of the sash containing the glass or glasses to and from a position across the window opening so as to afford a clear open vision ahead and ventilation for the cab in warm, dry weather.

A still further object is to provide means, such as a movable screen, adapted to be drawn across the sight opening or window to prevent the entrance of cinders, dust or other foreign matter, to the cab when the window is wholly or partially open without interfering with the clear vision ahead of the train.

Other objects and uses relating to specific parts of the device will be brought out in the following description.

Figure 6:
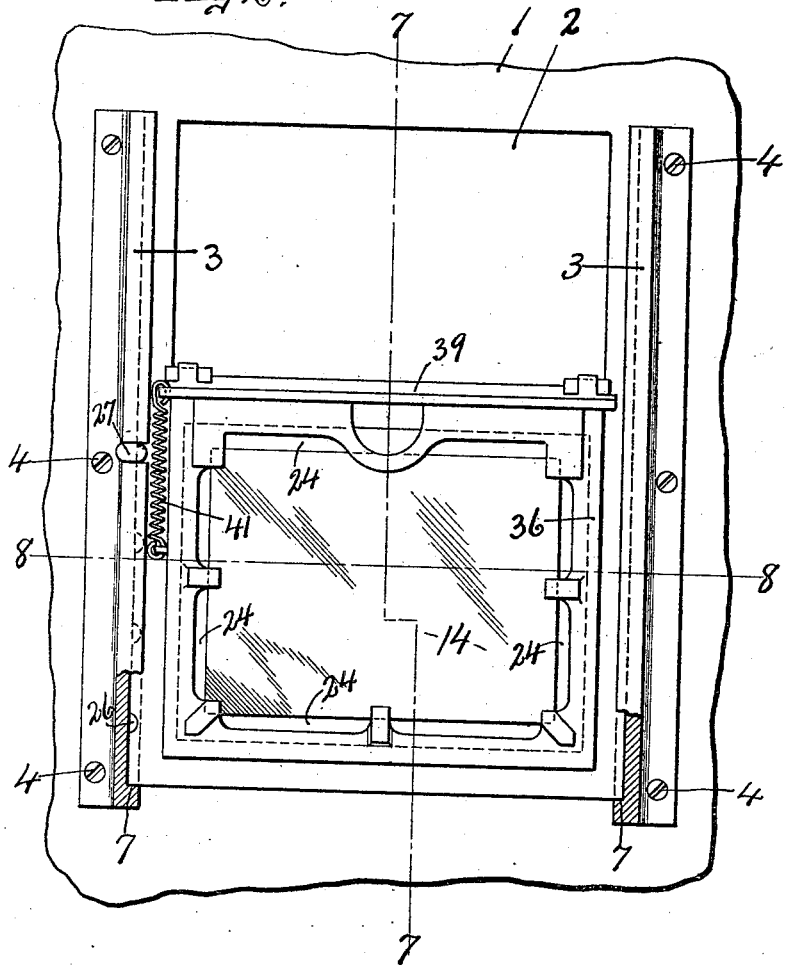
Figure 7:
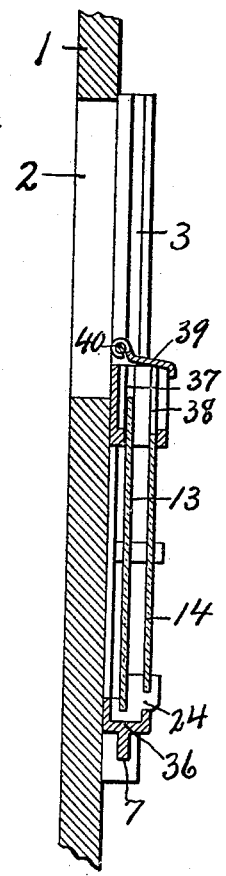
Figure 8:
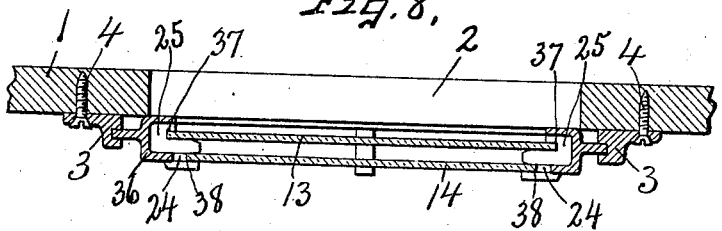

In the drawings—Figure 1 is a front elevation partly broken away and partly in section of a cab showing the various features of the preferred form of my invention. Figs. 2 and 3 are vertical and horizontal sectional views taken respectively on lines 2—2 and 3—3, Fig. 1. Fig. 4 is an elevation of a portion of one corner of the window sash showing the two plates of glass and retaining means therefor. Fig. 5 is a sectional view similar to Fig. 3 showing a slightly modified construction of inner glass plates for larger windows. Fig. 6 is an elevation similar to Fig. 1 of a window showing a modified form of window sash. Figs. 7 and 8 are sectional views taken respectively on lines 7—7 and 8—8, Fig. 6.

In Figs. 1 to 4 inclusive I have shown a portion of a front —1— of a cab having a window-opening —2— of suitable size and suitable sash guides or ways —3— secured to the outer face of the front side —1— of the cab at opposite sides of the window-opening —2— by suitable fastening means, as screws —4—, said guides being parallel with each other and provided on their inner sides with channels for the reception of a vertically slidable sash or frame —6—. These guide bars or ways —3— extend from the top of the opening —2— downwardly some distance below the bottom of said opening and are provided at their lower ends with stop shoulders —7— for limiting the downward movement of the sash —6—. This sash preferably consists of an inner frame —8— and an outer frame —9— hinged at its lower end at —10— to the lower edge of the inner frame —8— and adapted to rock forwardly and downwardly.

The inner and outer frames —8— and —9— are preferably made of cast or sheet metal and are both rectangular in form and provided with suitable sight openings —11— and —12—, across which are supported inner and outer glass plates —13— and —14—. The outer frame —9— which supports the glass plates —13— and —14— is held in its closed position by a suitable catch —15— which is journaled in the upper side of the frame —8— just above the outer frame —9—, and is provided at its inner end with a hand piece or knob —16—, while its forward or outer end is provided with a radially projecting arm —17— which is movable into and out of engagement with a suitable shoulder on the adjacent front face of the frame —9—.

The glass plates —13— and —14— are removably secured at intervals along their marginal edges within the swinging frame —9— and are spaced some distance apart from each other and from the inner frame —8— to allow a free circulation of air between and across both faces of both glass plates. The outer or front plate —14— is of somewhat smaller area than the inner plate —13— and is held in place between coacting retaining members —18— and —19—, one of which (as the retaining member —19—) is movable, and is preferably pivoted at its outer end at —20— to an adjacent portion of the frame —9—, so it may be swung or rocked laterally into and out of operative engagement with the inner face of the glass plate —14— to permit the removal or replacement of such plate, and at the same time serve to hold said plate in its operative position when adjusted for use. In like manner the inner glass plate —13— is held in place by coacting sets of retaining members —21— and —22— arranged at intervals around the marginal edges of said plate and forming a part of the frame —9—, one of each set of coacting members, as —22—, being pivoted at —23— to the adjacent portion of the frame —9— so as to be capable of movement into and out of operative engagement with the inner face of the glass —13—, thereby making it possible to readily remove or replace said glass, and at the same time serving to retain said plate in operative position when adjusted for use.

The front glass —14— is of less area than the opening —12— in which it is located, leaving an intervening marginal space —24— between the marginal edges of the glass and inner edges of the adjacent portions of the frame, said space —24— extending entirely around the edges of the glass except where the narrow retaining members —18— are located, thereby affording a free passage for the air through said spaces —24— and between the glass plates —13— and —14—. The inner glass plate —13— is of somewhat greater area than the opening —12— in the frame —9—, but is of less area than the portion of the frame in which it is mounted so as to leave a clear open space —25— entirely around the margin of the plate —13— except where the narrow lugs or retaining members —21— and —22— are located.

The frame —9— when closed, as shown in Figs. 1 and 2, fits closely against the front face of the frame —8— around and some distance from the opening —11— therein, and also surrounds and is spaced some distance apart from the marginal edges of the glass plates —13— and —14— so that when in operation, as for instance when the sash is moved upwardly across the opening —2—, the air from the exterior or front of the cab impacts against the front glass —14— and passes through the openings —24— at the marginal edges of such glass, where it impinges against and traverses the face of the inner glass and thence through the openings —25— at the marginal edges of said inner glass and through the openings —11— and —2— into the cab, while the warm air from the interior of the cab passes outwardly through the same openings, and in either case the air is caused to traverse in rapid circulation across both faces of both glasses, thereby effectively removing any accumulations of moisture, snow or other foreign matter which may tend to accumulate on either of the glass plates, and affording at all times a clear vision through said plates.

The entire window sash, including both of the frames —8— and —9— and glass plates —13— and —14—, is slidable vertically in the ways —3—, and in order that such sash may be held in its extreme up-position, or at two or more intermediate points of adjustment, at least one edge of the frame —8— which rides in the ways —3—, is provided with notches or recesses —26— adapted to be engaged by a movable locking bolt —27— in the window frame —1—, as best seen in Figs. 1 and 3.

In the use of comparatively large windows, the inner glass plate is preferably made in sections, as —28— and —29—, one of which, as —28—, nearest to the boiler, is somewhat narrower transversely than the other section —29—, and this latter section is preferably arranged in a plane at an angle with that of the section —28— and front plate —14— so that the inner vertical edge of the plate —29— is disposed in a plane substantially midway between, but spaced apart from, the plates —28— and —14—, leaving an air passage —5— between the meeting edges of the sections —28— and —29—. The object in dividing the inner glass plate into sections is to insure the circulation of air across the entire inner and outer surfaces of both plates.

It will be seen that the front face of the inner glass section —28— will cause the air to be rapidly circulated laterally or transversely across the surface of such section and through the opening —5— and across the inner face of the plate section —29—, thereby effectively removing the accumulations of steam, moisture and other foreign matter therefrom, and at the same time the impact of the air against the front plate —14— will cause such air to traverse the face of such glass and to pass through the openings —24— and against the section —28—, the lateral incline of the plate —29— serving to deflect the air against the inner face of the plate —14— and thence across the surface of the section —28— so that the air from within the cab and also from the exterior thereof is always traveling back and forth transversely across the inner and outer surfaces of both the inner and outer plates to effectively remove all moisture, snow and other foreign matter therefrom.

If it should become necessary to remove either one of the glass plates by reason of breakage or other cause, the frame —9— may be released by proper movement of the detent —15—, thereby permitting said frame to be rocked forwardly and downwardly, whereupon the retaining members —19— and —22— may be shifted to permit either or both of the plates to be removed and others inserted, the frame —9— being then returned to its operative position and locked by the member —15—.

In order to preclude as far as practicable the entrance of cinders, dust, rain and snow, to the cab through the opening —2— when the window sash is down, I provide a projecting hood —30— and a movable screen —31—, the hood —30— being secured to the front of the cab directly above the window opening —2— and being provided with side pieces —32—, which, together with the upper part of the hood, inclose the upper end of the opening —2—.

The screen —31— is practically coextensive with and lies directly under the upper part of the hood, where it is normally held by a coil spring —33—, as best seen in Figs. 1 and 2, the front end or edge of the screen being attached to a suitable operating member, as a cable —34—, which extends through an opening in the front of the cab in one side of the window opening —2— and is provided with a handle —35— just inside of the cab, whereby the screen may be drawn downwardly across the window opening —2— and against the action of the spring —33— to further prevent the entrance of cinders to the interior of the cab when the window sash is down, as shown in Figs. 1 and 2. This is particularly advantageous when two engines are passing each other in close proximity.

In Figs. 6, 7 and 8 is shown a window sash or vertically slidable frame —36— as guided in upright ways —3— and containing front and inner and outer glass plates —13— and —14— similar to those shown in Figs. 1, 2 and 3, but in this instance the frame —36— is made in one section and is provided with an opening in its upper side and formed with vertical grooves —37— and —38— for the reception and retention of the plates —13— and —14—, the top of the frame being covered by a hood or cover —39— which is hinged at —40— to the frame 36 and when closed prevents the entrance of rain, snow or other foreign matter between the glass plates, and at the same time by rocking the same upwardly and rearwardly permits the removal and replacement of said plates. In other respects the relation of the glass plates to each other and to their supporting frame is substantially the same as shown in Figs. 1, 2 and 3, the hood —39— being held in its closed position by a spring —41—.

The operation of my invention will now be readily understood upon reference to the foregoing description and accompanying drawings.

What I claim is:—

1. In combination with the window frame and opening of a locomotive cab, a window sash and glass plates of unequal area supported in said sash and spaced apart from each other, the greater portion of the marginal edges of both plates being spaced apart from the sash forming intervening air passages.

2. In combination with the window frame and opening of a locomotive cab, a window sash slidable to and from a position across the opening in the window frame, separate parallel glass plates mounted in the sash and spaced apart from each other and having the greater portions of their marginal edges spaced apart from said sash.

3. In combination with a window frame and opening of a locomotive cab, a window sash movable across said opening, separate glass plates removably mounted in the sash and spaced apart from each other and having the greater portions of their marginal edges spaced apart from the sash leaving intervening air passages, the front glass plate being of less area than the other glass plate.

4. The combination with a window frame and opening, a sash frame, a glass plate removably mounted in the sash frame and having the greater portion of its marginal edges spaced apart therefrom forming intervening air passages across both sides of the plate, and movable retaining means for the plate.

5. In combination with a window frame and opening, a sash mounted on the frame and movable to and from a position across said opening, a glass plate mounted in the sash, said plate having the greater portion of its marginal edge spaced apart from the frame forming intervening air passages, the frame having at least one of its sides movable to permit the removal of the glass plate.

6. In combination with a window frame and opening, a sash mounted on the frame and movable to and from a position across said opening, glass plates of unequal area mounted in the sash, said plates having the greater portion of their marginal edges spaced apart from the frame forming intervening air passages, the frame having at least one of its sides movable to permit the removal of the glass plate.

In witness whereof I have hereunto set my hand this 30th day of June, 1909.

JAMES W. ESTES.

Witnesses:
H. E. CHASE,
J. M. HOES.